United States Patent
Kokami et al.

(10) Patent No.: US 6,903,894 B2
(45) Date of Patent: Jun. 7, 2005

(54) MAGNETIC DISC STORAGE APPARATUS

(75) Inventors: Yasuhiko Kokami, Takasaki (JP); Kenji Nishimura, Takasaki (JP); Tatsuya Negishi, Fujioka (JP)

(73) Assignees: Hitachi, Ltd., Tokyo (JP); Hitachi ULSI Systems Co., Ltd., Tokyo (JP)

( * ) Notice: Subject to any disclaimer, the term of this patent is extended or adjusted under 35 U.S.C. 154(b) by 509 days.

(21) Appl. No.: 10/012,401

(22) Filed: Dec. 12, 2001

(65) Prior Publication Data

US 2002/0071199 A1 Jun. 13, 2002

(30) Foreign Application Priority Data

Dec. 13, 2000 (JP) ........................................ 2000-379231

(51) Int. Cl.[7] ............................................. G11B 5/596
(52) U.S. Cl. .................. 360/77.02; 360/78.04
(58) Field of Search ............................ 360/77.02, 78.04

(56) References Cited

U.S. PATENT DOCUMENTS 5,838,515 A * 11/1998 Mortazavi et al. ........ 360/78.12

* cited by examiner

Primary Examiner—Sinh Tran
Assistant Examiner—Mitchell Slavitt
(74) Attorney, Agent, or Firm—Antonelli, Terry, Stout & Kraus, LLP

(57) ABSTRACT

A magnetic disc storage apparatus including a magnetic head for reading information from a storage track on a magnetic storage disc driven to spin, a voice coil motor for moving the magnetic head above the disc, and a magnetic head drive system for executing a position control of the magnetic head by controlling driving current of the voice coil motor by a feedback control while monitoring a state of reading the magnetic head in which the magnetic head drive system includes multi-mode driving means for executing a linear drive mode for controlling, as an analog amount, the driving current of the voice coil motor when an amount of driving to move the magnetic head is small and executing a pulse drive mode for controlling, as a digital amount, the driving current of the voice coil motor when the amount of driving to move the magnetic head is large.

By the invention, both of high accuracy formation of position control of the magnetic head in tracking and high speed formation of access by shortening seek time are enabled while effectively reducing heating or EMI inducing read/write error.

17 Claims, 7 Drawing Sheets

MAGNETIC DISC STORAGE APPARATUS

BACKGROUND OF THE INVENTION

1. Field of the Invention

The present invention relates to a technology of controlling a magnetic disc storage apparatus, in details, to a technology of controlling a voice coil motor for moving a magnetic head for reading/writing information to and from a storage track on a magnetic storage disc driven to spin.

2. Description of the Related Art

A magnetic disc storage apparatus includes a magnetic head for reading/writing information to and from a storage track on a magnetic storage disc driven to spin, a voice coil motor for moving the magnetic head above a disc and a magnetic head driving system for carrying out position control of the magnetic head by controlling driving current of the voice coil motor by a feedback control while monitoring a state of reading of the magnetic head.

An information recording density of a magnetic disc storage apparatus has been increased year by year and in accordance therewith, very high accuracy has also been requested for position control of a magnetic head. Therefore, in driving a voice coil motor of moving the magnetic head, there is adopted a linear drive system for continuously changing an amount of driving current of the voice coil motor.

However, it has been clarified by the inventors that the following problem is posed in the above-described technology.

That is, according to a magnetic disc storage apparatus, with high density formation of storage, high speed formation of access is also requested. Although in order to realize high speed access, a time period of moving the magnetic head to a predetermined storage track, so-to-speak seek time, must be shortened, for such purpose, driving current of the voice coil motor needs to increase.

However, when the driving current of the voice coil motor is increased, power dissipation for linearly controlling the driving current is increased and a heating amount is increased in accordance therewith. The heating in seeking effects adverse influence on operation and characteristics of the magnetic head and the magnetic storage disc, thereby, for example, there causes a drawback that read/write error is liable to produce.

Hence, in order to alleviate the heating, the inventors have investigated to control the driving current of the voice coil motor by pulse width modulation (PWM) control. That is, the inventors have investigated a pulse drive system for controlling to drive the voice coil motor not by continuously changing an amount of the driving current of the voice coil motor but by changing a ratio of driving period vs non-driving period of the driving current. In this case, the voice coil motor is controlled to drive by fixing the amount of the driving current of the voice coil motor to a vicinity of a maximum value thereof and changing the ratio of driving period vs non-driving period.

However, it has been clarified that there poses a problem that although the pulse drive system is effective in restraining the heating amount by reducing power dissipation, in comparison with the above-described linear drive system, it is difficult to sufficiently ensure control accuracy, particularly, positioning accuracy of the magnetic head in tracking when an amount of moving the magnetic head is small, EMI (electromagnetic interference) noise produced in accordance with pulse control of the driving current, jumps into the magnetic head and there is a high possibility of inducing read error of a hard disk drive.

SUMMARY OF THE INVENTION

It is an object of the invention to provide a technology of controlling to drive a voice coil motor enabling both of high accuracy formation of position control of a magnetic head in tracking and high speed formation of access by shortening seek time while effectively reducing heating or EMI inducing read/write error.

In order to achieve the above-described object, according to the invention, there is provided a magnetic disc storage apparatus comprising a magnetic head for reading information from a storage track on a magnetic storage disc driven to spin, a voice coil motor for moving the magnetic head above the disc and a magnetic head drive system for executing a position control of the magnetic head by controlling driving current of the voice coil motor by a feedback control while monitoring a state of reading the magnetic head:

wherein the magnetic head drive system includes multi-mode driving means for executing a linear drive mode for controlling, as an analog amount, the driving current of the voice coil motor when an amount of driving to move the magnetic head is small and executing a pulse drive mode for controlling, as a digital amount, the driving current of the voice coil motor when the amount of driving to move the magnetic head is large.

According to the invention, whereas in tracking in which the amount of driving to move the magnetic head is small, the driving current of the voice coil motor is controlled as an analog amount to thereby enable to achieve high positioning accuracy, in seeking in which the amount of driving to move the magnetic head is large, the driving current of the voice coil motor is controlled as a digital amount to thereby enable to drive to move the magnetic head at high speed without being accompanied by significant power dissipation. Thereby, both of high accuracy information of position control of the magnetic head in tracking and high speed formation of access by shortening seek time are enabled while effectively reducing heating or EMI inducing read/write error.

In a preferable mode of the magnetic head driving system, the magnetic head drive system executes the linear drive mode in a state of tracking in which the magnetic head sequentially scans contiguous ones of the storage tracks and executes the pulse drive mode in seeking in which the magnetic head moves to ride over the storage tracks.

Further, in other preferable mode of the magnetic head driving system, the magnetic head executes the linear drive mode when an instruction value for controlling the driving current of the voice coil motor is less than a predetermined threshold and executes the pulse drive mode when the instruction value for controlling the driving current of the voice coil motor is equal to or higher than the predetermined threshold. According to the other preferable mode, a determination of switching the linear drive mode and the pulse drive mode can simply be carried out based on the instruction value for control.

According to other preferable mode of the invention, in switching the linear drive mode and the pulse drive mode, there is further provided means of timing control for determining a timing at which a transient value of the driving current of the voice coil motor constitutes an average value thereof and the means of timing switches the linear drive mode and the pulse drive mode in synchronism with the timing determined by the timing control means. According to the timing control means, shift between the linear drive mode and the pulse drive mode can smoothly be carried out.

Still other feature and advantages of the present invention will become apparent to those of ordinary skilled in the art upon reading and understanding the following detailed description of the preferred and alternate embodiment.

DESCRIPTION OF THE PREFERRED EMBODIMENTS

Figure 1:
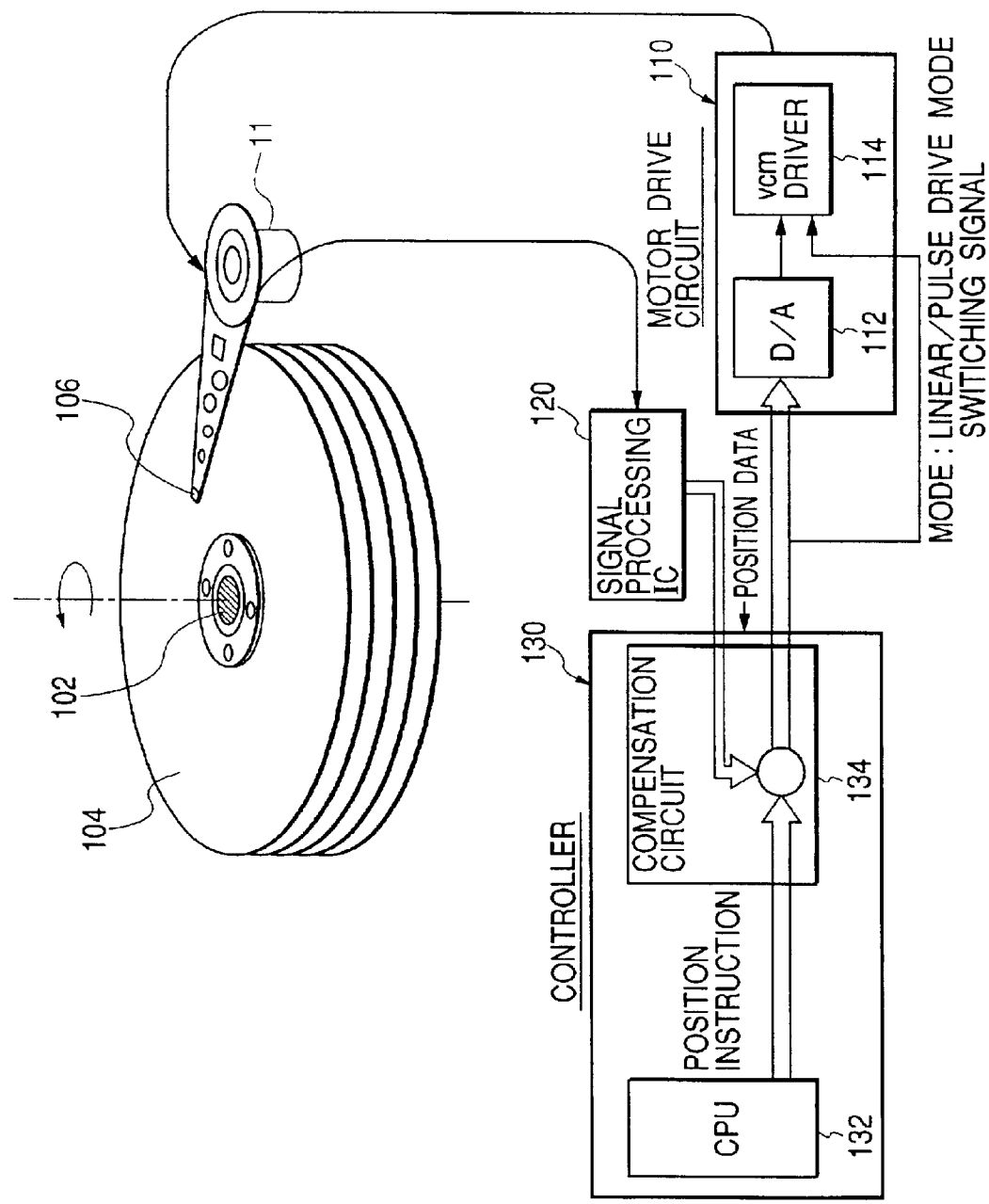
FIG. 1 is a block diagram showing an outline of a magnetic disc storage apparatus to which the technology of the invention is applied.

An explanation will be given of embodiments of the invention in reference of the drawings as follows.

Further, in the drawings, the same notations designate the same or corresponding portions.

FIG. 1 shows an outline of a magnetic disc storage apparatus to which the technology of the invention is applied.

The magnetic disc storage apparatus shown in the drawing includes a magnetic storage disc 104 driven to spin at high speed by a spindle motor 102, a magnetic head 106 for reading/writing information to and from a storage track on the magnetic storage disc 104, a voice coil motor 11 for moving the magnetic head 106 above the disc 104, a motor drive circuit 110 for driving the voice coil motor 11, a signal processing circuit (process circuit IC) 120 for reading position data from a read signal of the magnetic head 106 and a controller 130 for transmitting a driving current instruction value to the motor drive circuit 110 based on the position data read by the signal processing circuit 120.

Here, the controller 130 includes a microcomputer (CPU) 132 for governing operation of a total of the magnetic disc storage apparatus and a compensation circuit 134 for generating driving current instruction based on position instruction from the microcomputer 132 and the position data from the signal processing circuit 120. The driving current instruction value generated by the compensation circuit 134 is transmitted to the motor drive circuit 110.

The motor drive circuit 110 includes a D/A converter 112 for converting the driving current instruction value in a digital data format transmitted from the controller 130 into a driving current instruction value in an analog style and a VCM driver 114 for conducting driving current to the voice coil motor 11 based on the driving current instruction value of the analog style. The VCM driver 114 constitutes multi-mode driving means for executing 'linear drive mode' of linearly controlling the driving current of the voice coil motor 11 when an amount of driving to move the magnetic head 106 is small and executing 'pulse drive mode' for controlling the driving current of the voice coil motor 11 by pulse width modulation (PWM) when the amount of driving to move the magnetic head 106 is large.

The controller 130 discriminates the level of the driving current value instructed by the driving current instruction value generated by the compensation circuit 134 by use of a predetermined threshold and transmits a result of discriminating the level to the VCM driver 114 as a drive mode switching signal MODE. The switching signal MODE instructs 'linear drive mode' when the driving current instruction value generated by the compensation circuit 134 is less than the predetermined threshold and instructs 'pulse drive mode' when the driving current instruction value is equal to or higher than the threshold. The VCM driver 114 is constituted to execute to switch 'linear drive mode' and 'pulse drive mode' in accordance with instruction of the switching signal MODE.

By providing the above-described magnetic head drive system, in tracking in which a moving amount of the magnetic head 106 is small, high positioning accuracy can be achieved by linearly controlling the voice coil motor driving current, meanwhile, in seeking in which the moving amount of the magnetic head 106 is large, by controlling the voice coil motor driving current by pulse width modulation (PWM), the magnetic head 106 can be driven to move at high speed without being accompanied by large power dissipation. Thereby, while effectively reducing heating or EMI inducing read/write error, both of high accuracy formation of position control of the magnetic head in tracking and high speed formation of access by shortening seek time are achieved.

Here, the above-described magnetic head drive system sets conditions of generating the drive mode switching signal MODE such that 'linear drive mode' is executed in a tracking state in which the magnetic head 106 traces a predetermined storage track in read/write states and 'pulse drive mode' is executed is seeking in which the magnetic head 106 moves to ride over storage tracks. Thereby, both of promotion of positioning accuracy of the magnetic head in tracking and high speed formation of access by shortening seek time, are optimized.

Figure 2:
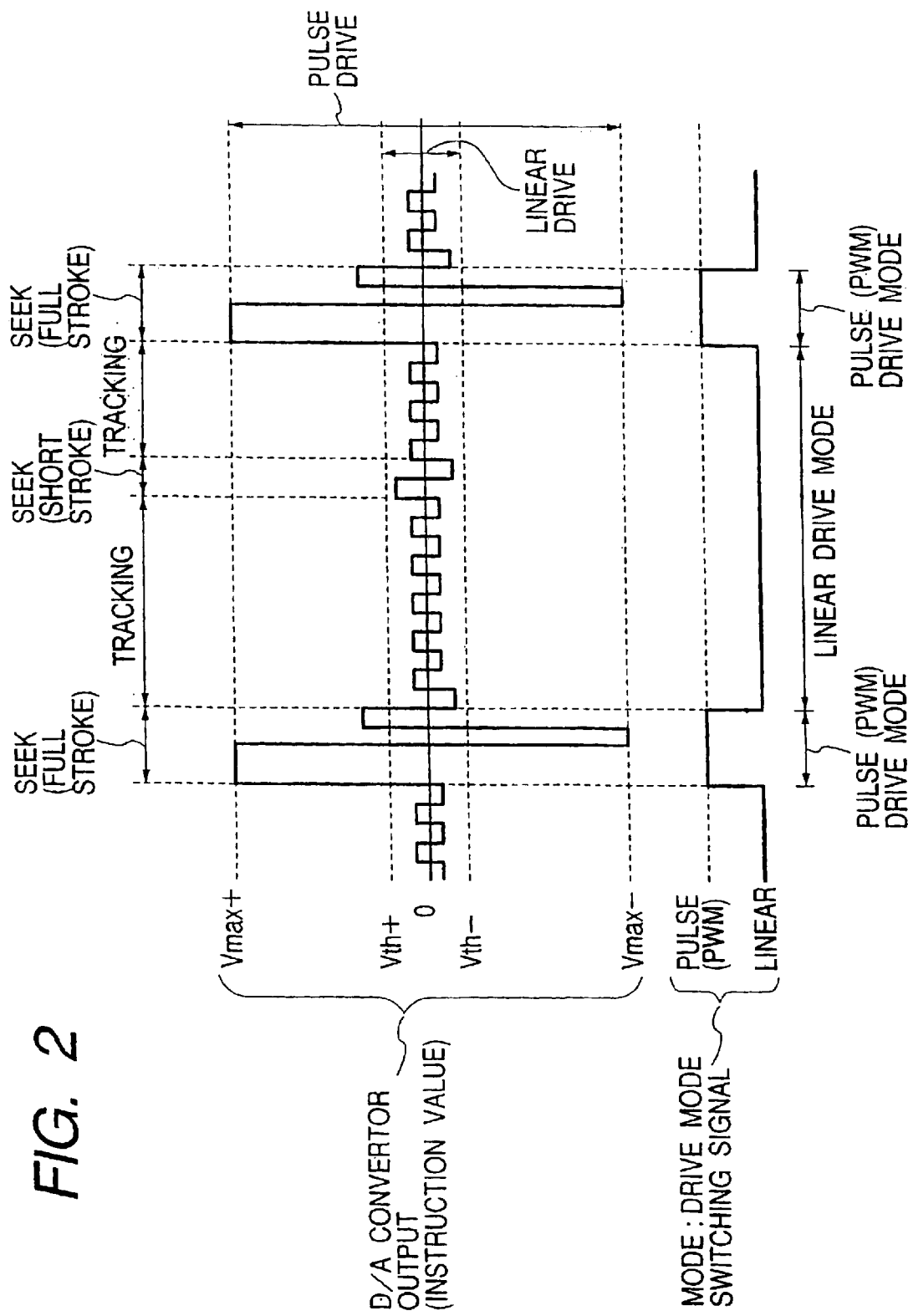
FIG. 2 is a timing chart showing an example of operation at an essential portion of the apparatus shown in FIG. 1.

FIG. 2 shows an example of operation of the motor drive circuit 110 shown in FIG. 1 by a timing chart.

In the drawing, in seeking, a necessary amount of moving the magnetic head 106 is large and in accordance therewith, a driving current instruction value of a full range, that is, a maximum scale (Vmax+/Vmax−) is issued from the controller 130. The instruction value (Vmax+/Vmax−) is subjected to analog conversion by the D/A convertor 112 and is given to the VCM driver 114. In the VCM driver 114, there is executed the pulse drive mode for controlling the driving current to the voice coil motor 11 by pulse width modulation (PWM) such that average driving current of the voice coil motor 11 becomes the instruction value. Thereby, the magnetic head 106 is driven to seek at high speed.

When the magnetic head 106 is driven to seek and is brought into a state of being approximately positioned to the predetermined storage track, the necessary amount of moving the magnetic head 106 is reduced and in accordance therewith, the driving current instruction value issued from the controller 130 is also reduced. When the magnitude (absolute value) of the driving current instruction value becomes less than the predetermined threshold (Vth), the drive mode switching signal MODE is changed from the pulse drive mode (high level) to the linear drive mode (low level). Thereby, the VCM driver 114 executes the linear drive mode such that the driving current of the voice coil motor 11 becomes the above-described instruction value by linear control to thereby control to position the magnetic head 106 with high accuracy.

Figure 3:
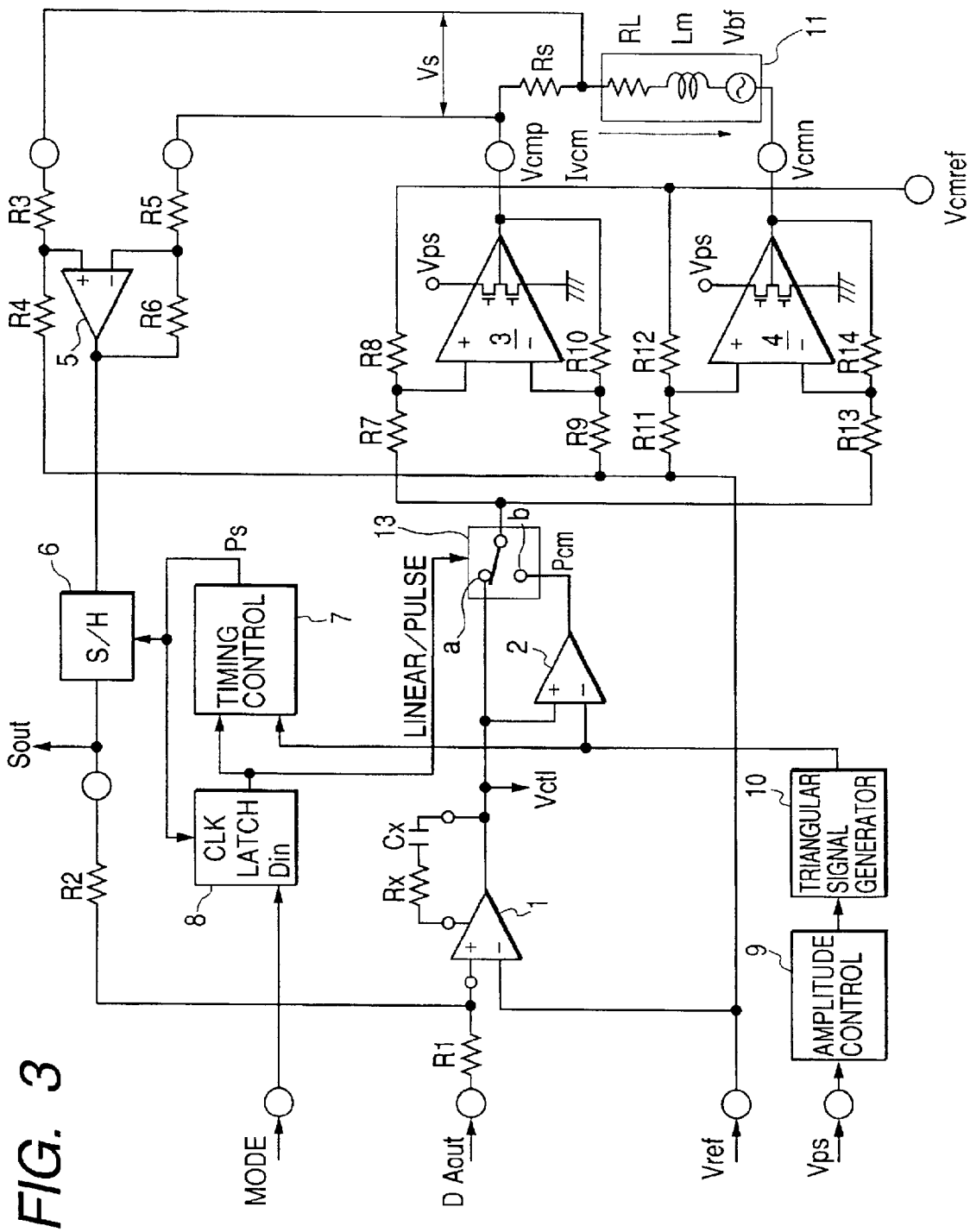
FIG. 3 is a circuit diagram showing a first embodiment of a VCM driver used in the invention.
Figure 4:
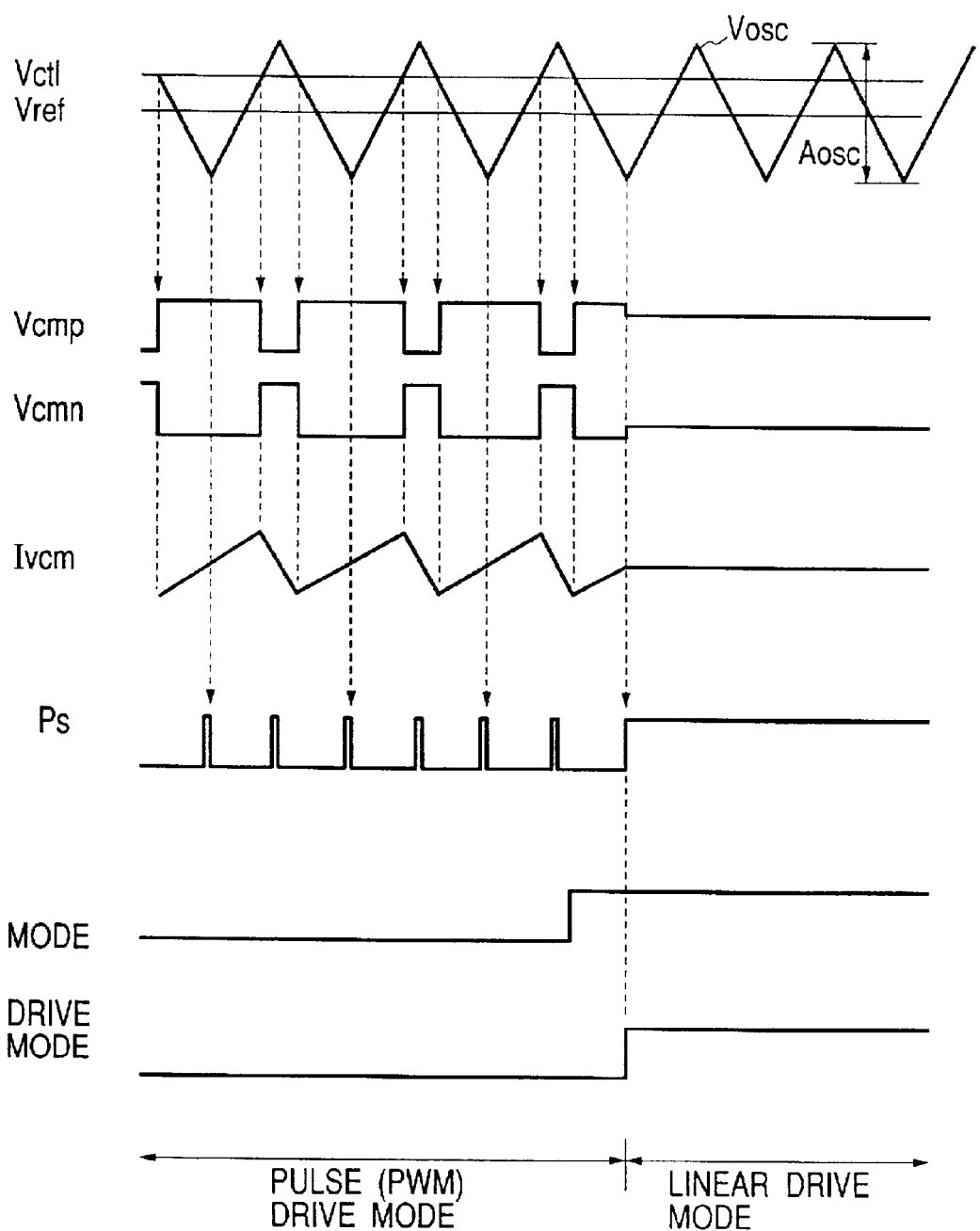
FIG. 4 is a timing chart showing an example of operation at an essential portion of the VCM driver shown in FIG. 3.

FIG. 3 shows a first embodiment of the VCM driver 114, further, FIG. 4 shows an operation timing chart at an essential portion of the VCM driver shown in FIG. 3.

As shown by FIG. 3, the VCM driver 114 is constituted by a control amplifier 1, a PWM comparator 2, output amplifiers 3 and 4, a current sense amplifier 5, a sample hold (sampling and holding) circuit 6, a timing control circuit 7, a latch circuit 8, an amplitude control circuit 9, a triangular signal generator 10, a mode switching switch 13 and so on. The respective amplifiers 1, 3 through 5 are constituted by operational amplifiers respectively having differential input and by optimally determining constants of elements such as resistors R1 through R14 in the amplifiers, circuit operation characteristics such as gains are respectively set to be desired characteristics.

Further, in the drawing, notation DAout designates the driving current instruction value outputted after having been subjected to digital/analog conversion at the D/A converter 112, notation Vps designates power source voltage and notations Vref and Vcmref respectively designate operation reference voltages of circuits.

The control amplifier 1 transmits the driving current instruction value DAout converted into an analog signal by the D/A convertor 112 in accordance with a time constant set by a resistor Rx and capacitor Cx and outputs the value as control voltage (control target voltage) Vctl. The PWM comparator 2 generates a pulse signal Pcm a width of which is changed in accordance with the control voltage Vctl by comparing levels of a triangular signal Vosc outputted from the triangular signal generator 10 and the control voltage Vctl. That is, the PWM comparator 2 generates the pulse signal Pcm subjected to PWM modulation by the control voltage Vctl.

The output amplifiers 3 and 4 are current drivers set with predetermined voltage gains by the resistors R7 through R14, complimentarily driven by the pulse signal Pcm and makes driving current Ivcm flow to the voice coil motor 11. The driving current Ivcm is supplied to a driving terminal of the voice coil motor 11 via a current detecting resistor Rs. The conduction driving is carried out bidirectionally by a pair of the output amplifier 3 and 4, thereby, the voice coil motor 11 is also driven bidirectionally. In the drawing, notation Vcmp designates output voltage of the output amplifier 3 on one side and notation Vcmn designates output voltage of the output amplifier 4 on other side, respectively.

According to the embodiment, the voice coil motor driving current Ivcm is converted into voltage by the current detecting resistor Rs and is detected by the sense amplifier 5. The converted voltage Vs (=Rs×Ivcm) is amplifiered by voltage gain set by the resistors R3 through R6 by the current sense amplifier 5 and is inputted to the sample hold circuit 6. The sample hold circuit 6 samples the current detecting voltage Vs in synchronism with a sampling pulse Ps generated by the timing control circuit 7. The timing control circuit 7 detects peaks (upper side peak and lower side peak) of the triangular signal Vosc and generates the sampling pulse signal Ps at every peak detecting point.

The latch circuit 8 latches the drive mode switching signal MODE given from a side of the controller 130 in synchronism with the sampling pulse Ps and outputs the drive mode switching signal MODE. When the drive mode switching signal MODE is changed from a low level to a high level, in synchronism with an initial one of the sampling pulse Ps successive thereto, an output of the timing control circuit 7 is fixed to the high level. Thereby, the sample hold circuit 6 is set to an always sampling state for passing an input signal (current detecting voltage Vs) as it is. Along therewith, a selected position (a/b) of the mode switching switch 13 is switched from the pulse drive mode (b) to the linear drive mode (a). The state continues until the drive mode switching signal MODE recovers to the low level from the high level.

The amplitude control circuit 9 carries out amplitude control such that an amplitude Aosc of the triangular signal Vosc is proportional to power source voltage Vps. The drive current Ivcm supplied from the output amplifiers 3 and 4 to the voice coil motor 11 is changed by the power source voltage Vps. Therefore, in the case of driving the output amplifiers 3 and 4 by a pulse, when the power source voltage Vps is changed, current drive gain with respect to a width of the pulse is changed. To compensate for the change, the amplitude control circuit 9 controls the amplitude Aosc of the triangular signal Vosc by the following equation.

$Vps/Aosc = R8/R7 = R11/R12 = \text{constant}$

The mode switching switch 13 is set to switch in accordance with a logical level of the drive mode switching signal MODE. When MODE is at low level, the mode switching 13 is switched to a b side selecting position. At the switched position (b), there is executed 'pulse drive mode' for controlling the voice coil motor driving current Ivcm by pulse width modulation (PWM) by a pulse the width of which is changed in accordance with the current detecting voltage Vs.

In this case, the current detecting voltage Vs is sampled by the sampling pulse Ps generated by the peaks of the triangular signal Vs at a timing at an intermediary between ON and OFF of the voice coil motor driving current Ivcm. At the intermediary timing, a transient value of the voice coil motor driving current Ivcm constitutes an average value. Further, at the intermediary timing, kickback noise caused by ON/OFF of the drive current Ivcm is not generated. Thereby, the voice coil motor driving control in the pulse drive mode can accurately and stably be carried out based on the average value of the voice coil motor driving current Ivcm.

When the drive mode switching signal MODE is at the low level, the mode switching switch 13 is switched to an a side selecting position. At the switched position (a), there is executed 'linear drive mode' by continuously feeding back the voice coil motor driving current Ivcm via the sample hold circuit 6 brought into the always sampling state.

Switching from 'pulse drive mode' to 'linear drive mode' is carried out in synchronism with the sampling pulse Ps. Thereby, the switching is smoothly carried out at the timing at which the transient value of the voice coil motor driving current Ivcm constitutes the average value of one period of PWM.

The pulse drive mode is a sampling system driven by PWM constituting one period by an interval between the average value sampling pulse Ps of the driving current to a successive one of the current sampling pulse Ps and therefore, when the pulse drive mode is designed such that voltage gains from the output of the control amplifier 1 to a drive end of the voice coil motor, coincide with each other between the two drive modes, that is, when loop gains of system coincide with each other, at a point of generating the sampling pulse, output voltages and the drive currents Ivcm of the control amplifier 1 completely coincide with each other between the two drive modes. Therefore, by switching the drive modes in synchronism with the current sampling pulse Ps, output variation in mode switching can be nullified in principle.

Meanwhile, according to a magnetic disc storage apparatus, there is a case in which a magnetic head is brought into an uncontrollable state by seek error. The uncontrollable state can be detected by monitoring back emf voltage Vbf appearing at the driving terminal of the voice coil motor 11. Although in normal linear drive, the back emf voltage Vbf can be monitored from driving voltage of the voice coil motor 11 and driving current flowing in the voice coil motor 11, in the case of PWM drive, kick back noise caused by coil inductance Lm of the voice coil motor 11 (EMI noise by Ldi/dt) is generated and therefore, the back emf voltage Vbf only cannot directly be detected from the driving terminal of the voice coil motor 11.

Such a problem can be resolved by generating the sampling pulse Ps at the intermediary timing at which the kickback noise is not generated, as described above, detecting the average driving current in synchronism with the sampling pulse Ps and representing driving current of the motor by the output voltage Vctl of the control amplifier 1 which is a value indicating an output of an average value of driving voltage of the voice coil motor in one period of PWM. In the case of the circuit of the embodiment shown in FIG. 3, voltage (Sout) reflected with the back emf voltage Vbf can be taken out from an output side of the sample hold circuit 6 and voltage in correspondence with driving voltage of the motor can be taken out from the output Vctl of the controller amplifier 1.

Figure 5:
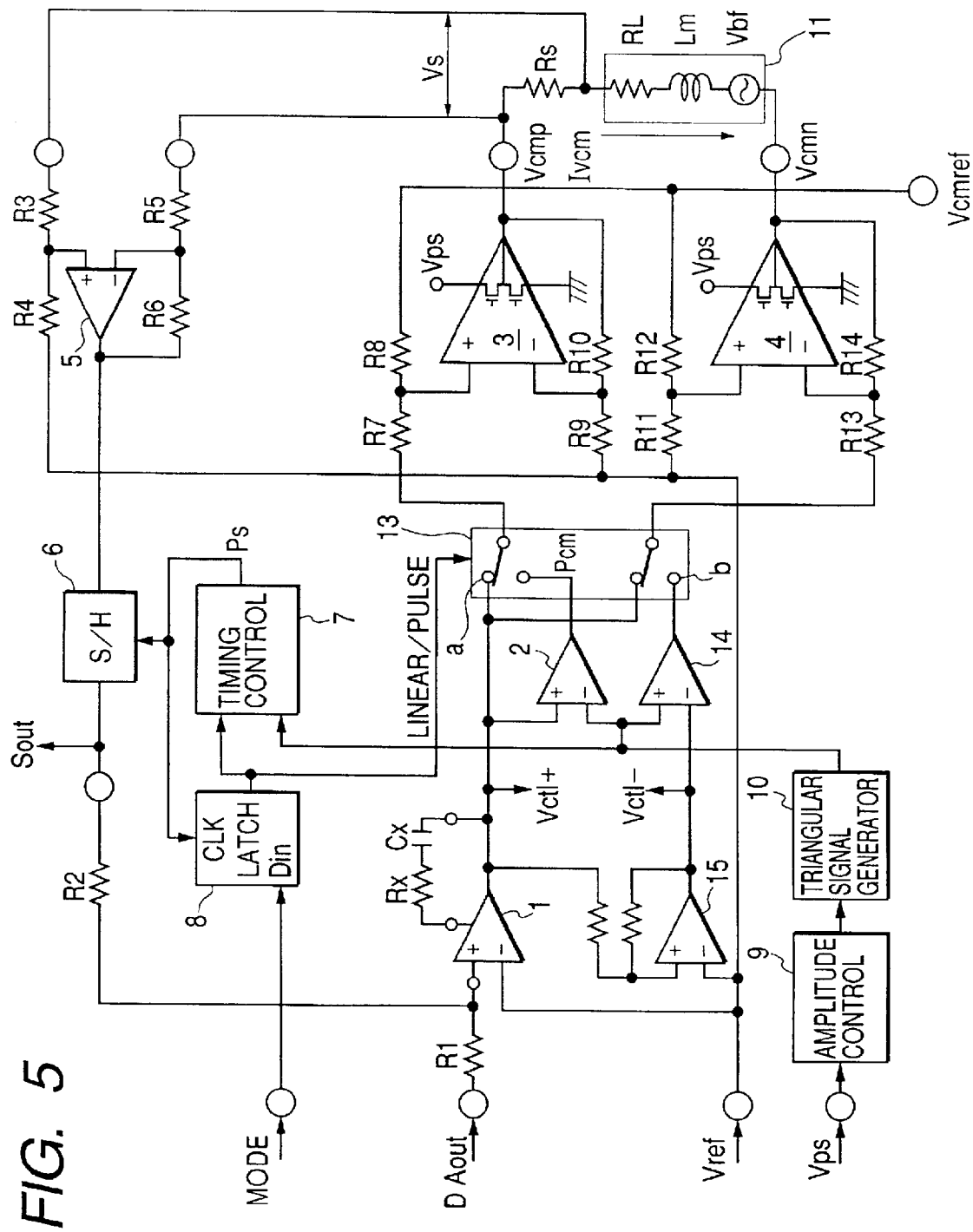
FIG. 5 is a circuit diagram showing a second embodiment of the VCM driver used in the invention.
Figure 6:
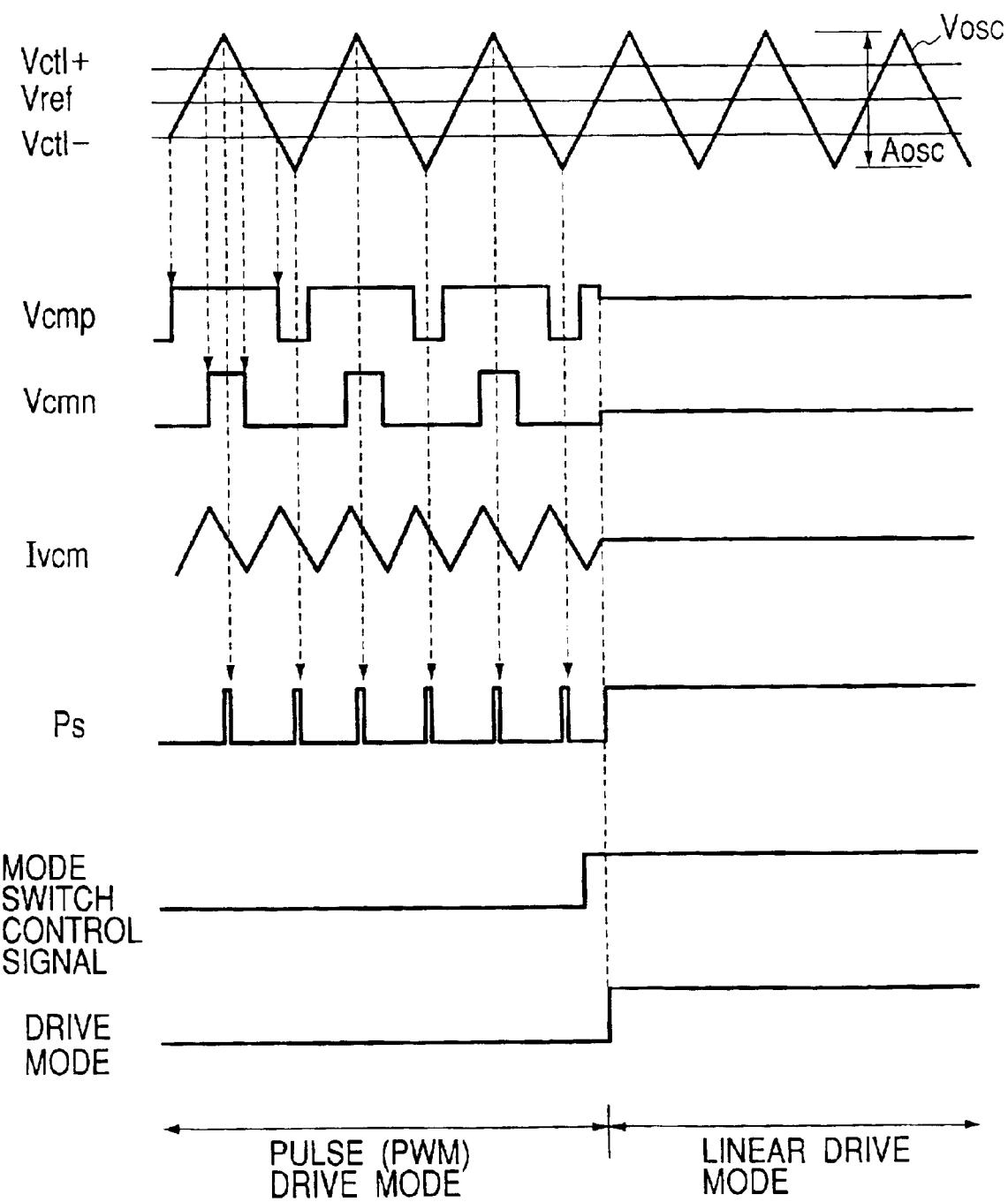
FIG. 6 is an operation timing chart at an essential portion of the VCM driver shown in FIG. 5.

FIG. 5 shows a second embodiment of the VCM driver 114. Further, FIG. 6 shows an operation timing chart at an essential portion of the VCM driver shown in FIG. 5.

Explaining of a difference from the above-described first embodiment (FIG. 3), according to the second embodiment, by adding a PWM comparator 14 and an invertor amplifier 15, phases of the output Vcmp of the output amplifier 3 for one side and the output Vcmn of the output amplifier 4 on other side, are shifted from each other by 180 degrees. Thereby, a sampling rate of the driving current Ivcm of the voice coil motor 11 in pulse drive mode can be doubled and therefore, frequency band, that is, accuracy and speed of control response of the voice coil motor drive control can be promoted. Further, linearlity of control gain at a vicinity of changing the polarity of the drive current can also be improved.

Figure 7:
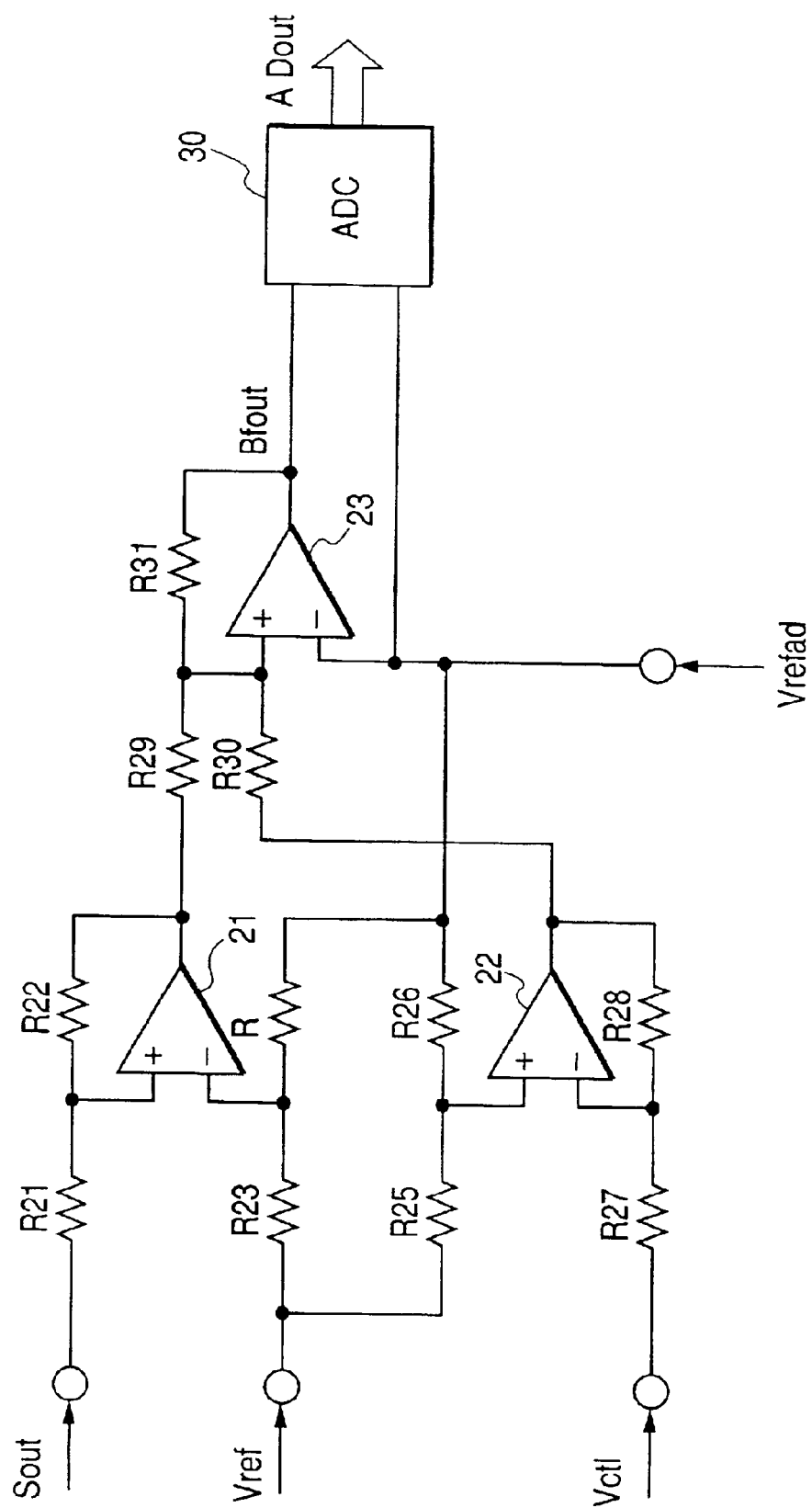
FIG. 7 is a circuit diagram showing an embodiment of a back emf detection circuit applied to the circuit of the first embodiment shown in FIG. 3.

FIG. 7 shows an embodiment of a back emf voltage detecting circuit applied to the circuit of the first embodiment shown in FIG. 3.

Although the uncontrollable state of the magnetic head caused by seek error can be determined from the state of the back emf voltage Vbf appearing at the driving terminal of the voice coil motor 11, the back emf voltage appearing at the driving terminal of the voice coil motor 11 includes an error amount by internal resistance RL and the driving current Ivcm of the voice coil motor 11. According to a circuit of the drawing, there is constituted analog operating means for canceling the error amount by operational amplifiers 21 through 23 and resistors R21 through R31. Back emf voltage Bfout the error of which has been compensated for by the means, is subjected to digital conversion (ADout) by an A/D convertor 30 and is transmitted to the controller 130. Notation Vrefad designates operation reference voltage of the A/D convertor 30.

Here, the back emf voltage Vbf of the voice coil motor 11, the driving voltage Vcmp of the voice coil motor 11, the driving current Ivcm flowing in the coil Lm of the voice coil motor 11, the internal resistance RL of the voice coil motor 11 and the current detecting resistor Rs, are brought into a relationship as shown by the following equation (1).

$$Vbf = (Vcmp - Vcmn) - Ivcm(Rs + RL) \quad (1)$$

Equation (1) is expressed by using set gains and outputs of the respective amplifiers in FIG. 3 as shown by the following equation (2).

$$Vbf = 2 \times Kout \times Vctl - (Vs/Ksens) \times (1 + RL/Rs) \quad (2)$$

where R4/R3=R6/R5=Ksens
R8/R7=R9/R10=Kout
R12/R11=R14/R13=Kout

Equation (2) is established both in the pulse/linear drive modes so far as a relationship of the following equation (3) is maintained in the pulse drive mode.

$$Kout = Vps/Aosc \quad (3)$$

Therefore, when gains of the respective amplifiers in FIG. 7 are set such that following equations (4) through (7) are established, only the back emf voltage Vbf of the voice coil motor 11 can be detected.

$$R22/R21 = R24/R23 = k1 \quad (4)$$

$$R26/R25 = R28/27 = k2 \quad (5)$$

$$R31/R29 = (1 + RL/Rs) \times \{1/(k1 \times Ksens)\} \quad (6)$$

$$R31/R30 = 2 \times Kout/k2 \quad (7)$$

Further the above-described relationships are established under conditions that input/output ranges of the respective amplifiers of the motor drive circuit (FIG. 3) fall in operation ranges and therefore, when operation exceeding the input/output ranges is caused, an additional circuit of clamping input voltage may pertinently be used.

Although as described above, a specific explanation has been given of the invention executed by the inventors based on the embodiments, the invention is not limited to the above-described embodiments but can naturally be modified variously within the range not deviated from the gist. For example, compensation of the error amount by the internal resistance RL and the driving current Ivcm of the voice coil motor 11 can also be processed digitally by the microcomputer 132 in the controller 130.

Although in the above-described explanation, an explanation has been given of a case in which the invention executed by the inventors is applied to the magnetic disc storage apparatus constituting a storage medium by a hard disc which is a utilization field constituting the background of the invention, the invention is not limited thereto but can also be utilized in a magnetic disc storage apparatus constituting a storage medium by a floppy disc.

What is claimed is:

1. A magnetic disc storage apparatus comprising:
   a magnetic head for reading information from a storage track on a magnetic storage disc driven to spin;
   a voice coil motor for moving the magnetic head above the magnetic storage disc; and
   a magnetic head drive system for executing a position control of the magnetic head by controlling a driving current of the voice coil motor by a feedback control while monitoring a state of reading of the magnetic head:

wherein the magnetic head drive system includes a multi-mode driving circuit executing a linear drive mode for controlling, as an analog amount, the driving current of the voice coil motor and executing a pulse drive mode for controlling, as a digital amount, the driving current of the voice coil motor, and wherein an amount of driving to move the magnetic head when the linear drive mode is executed is smaller than the amount of driving to move the magnetic head when the pulse drive mode is executed.

2. The magnetic disc storage apparatus according to claim 1, wherein the magnetic head drive system executes the linear drive mode in a state of tracking in which the magnetic head sequentially scans contiguous ones of the storage tracks and executes the pulse drive mode in seeking in which the magnetic head moves to ride over the storage tracks.

3. The magnetic disc storage apparatus according to claim 1, wherein the magnetic head drive system executes the linear drive mode when an instruction value for controlling the driving current of the voice coil motor is less than a predetermined threshold and executes the pulse drive mode when the instruction value for controlling the driving current of the voice coil motor is higher than the predetermined threshold.

4. The magnetic disc storage apparatus according to claim 1, further comprising:
a timing control circuit for determining a timing at which a transient value of the driving current of the voice coil motor constitutes an average value thereof;
wherein the timing control circuit switches the linear drive mode and the pulse drive mode in synchronism with the timing determined by the timing control circuit.

5. The magnetic disc storage apparatus according to claim 1, wherein the multi-mode driving circuit comprises:
a linear drive mode executing circuit for forming a linear control loop by a current detection circuit for detecting an average value of the driving current of the voice coil motor by converting the average value into a voltage, an error detection circuit for detecting a difference between the voltage detected by the current detection circuit and the instruction value for controlling the driving current, and a voice coil motor drive circuit outputting the driving current of the voice coil motor having a magnitude in correspondence with a detected output of the error detection circuit;
a pulse width modulation (PWM) circuit for generating a pulse having a width which is changed in accordance with the detected output of the error detection circuit;
a pulse drive mode executing circuit for controlling an output current of the voice coil motor drive circuit by the pulse generated by the pulse width modulation circuit; and
a switch circuit interposed between the linear control loop and the PWM circuit for switching between the linear drive mode and the pulse drive mode.

6. The magnetic disc storage apparatus according to claim 5, further comprising:
a sample hold circuit for sampling the voltage detected by the current detection circuit at the respective timing at which the transient value of the driving current of the voice coil motor constitutes the average value;
wherein the output current of the voice coil motor drive circuit is controlled based on a sampled output voltage of the sample hold circuit.

7. The magnetic disc storage apparatus according to claim 5, wherein by comparing a level of the detected output of the error detection circuit with a level of a triangular signal at a predetermined period, the pulse having the width of which is changed in accordance with the error detecting output is generated, wherein in the pulse drive mode for controlling the output current of the voice coil motor drive circuit, by detecting peaks of the triangular signal, the timing at which the transient value of the driving current of the voice coil motor constitutes the average value is determined and a voltage detected by a current detection circuit is sampled at the timing.

8. The magnetic disc storage apparatus according to claim 5, wherein a malfunction of the voice coil motor is determined by detecting a back emf voltage appearing at a driving terminal of the voice coil motor and the back emf voltage in executing the pulse drive mode is detected at the timing at which the transient value of the driving current of the voice coil motor constitutes the average value.

9. The magnetic disc storage apparatus according to claim 4, further comprising:
a determining circuit determining a malfunction of the voice coil motor by detecting a back emf voltage appearing at a driving terminal of the voice coil motor; and
an analog operating circuit canceling an error amount caused by an internal resistance of the voice coil motor and the driving current of the voice coil motor from the back emf voltage.

10. The magnetic disc storage apparatus according to claim 7, further comprising:
a triangular signal generator generating an output, an amplitude of which is set such that a voltage gain from an output of the error detection circuit to a drive end terminal of the voice coil motor remains the same between linear driving and PWM driving;
wherein the triangular signal generator includes a PWM generator having a function of adjusting the amplitude in proportion to power source voltage of the voice coil motor driving circuit.

11. A magnetic disc storage apparatus comprising:
a magnetic head for reading information from a storage track on a magnetic storage disc driven to spin;
a voice coil motor for moving the magnetic head above the magnetic storage disc; and
a magnetic head drive system for executing a position control of the magnetic head by controlling a driving current of the voice coil motor by a feedback control while monitoring a state of reading of the magnetic head;
wherein the magnetic head drive system includes a multi-mode driving function executing a linear drive mode for controlling the driving current of the voice coil motor as an analog amount and executing a pulse drive mode for controlling the driving current of the voice coil motor as a digital amount;
wherein an amount of driving to move the magnetic head when the linear drive mode is executed is smaller than an amount of driving to move the magnetic head when the pulse drive mode is executed;
wherein the magnetic head drive system executes the linear drive mode in a state of tracking in which the magnetic head sequentially scans contiguous ones of the storage tracks;
wherein the magnetic head drive system executes the pulse drive mode in a state of seeking in which the magnetic head moves to ride over the storage tracks when an instruction value for controlling the driving current of the voice coil motor is higher than a predetermined threshold; and wherein the magnetic head drive system executes the linear drive mode in a state of seeking in which the magnetic head moves to ride over the storage tracks when the instruction value for controlling the driving current of the voice coil motor is lower than the predetermined threshold.

12. The magnetic disc storage apparatus according to claim 11, further comprising:

a timing control circuit for determining a timing at which a transient value of the driving current of the voice coil motor constitutes an average value thereof;

wherein the timing control circuit switches the linear drive mode and the pulse drive mode in synchronism with the timing determined by the timing control circuit.

13. The magnetic disc storage apparatus according to claim 12, wherein the multi-mode driving function comprises:

a linear drive mode executing function for forming a linear control loop by a current detection circuit for detecting the average value of the driving current of the voice coil motor by converting the average value into a voltage, an error detection circuit for detecting a difference between the detected by the current detection circuit, and the instruction value for controlling the driving current and a voice coil motor drive circuit for outputting the driving current of the voice coil motor has a magnitude in correspondence with a detected output of the error detection circuit;

a pulse width modulation (PWM) circuit for generating a pulse a width of which is changed in accordance with the detected output of the error detection circuit;

a pulse drive mode executing function for controlling an output current of the voice coil motor drive circuit by the pulse generated by the pulse width modulation circuit; and a switch circuit interposed between the linear control loop and the PWM circuit for switching between the linear drive mode and the pulse drive mode.

14. A magnetic disc storage apparatus comprising:

a magnetic head for reading information from a storage track on a magnetic storage disc driven to spin;

a voice coil motor for moving the magnetic head above the magnetic storage disc; and a magnetic head drive system for executing a position control of the magnetic head by controlling a driving current of the voice coil motor by a feedback control while monitoring a state of reading of the magnetic head;

wherein the magnetic head drive system includes a multi-mode driving circuit executing a linear drive mode for controlling, as an analog amount, the driving current of the voice coil motor and executing a pulse drive mode for controlling, as a digital amount, the driving current of the voice coil motor;

wherein an amount of driving to move the magnetic head when the linear drive mode is executed is smaller than the amount of driving to move the magnetic head when the pulse drive mode is executed; and wherein the magnetic head drive system executes the linear drive mode in a state of tracking in which the magnetic head sequentially scans contiguous ones of the storage tracks and executes the pulse drive mode in seeking in a state of which the magnetic head moves to ride over the storage tracks.

15. A magnetic disc storage apparatus comprising:

magnetic head for reading information from a storage track on a magnetic storage disc driven to spin;

a voice coil motor for moving the magnetic head above the magnetic storage disc; and magnetic head drive system for executing a position control of the magnetic head by controlling a driving current of the voice coil motor by a feedback control while monitoring a state of reading of the magnetic head;

wherein the magnetic head drive system includes a multi-mode driving circuit executing a linear drive mode for controlling, as an analog amount, the driving current of the voice coil motor and executing a pulse drive mode for controlling, as a digital amount, the driving current of the voice coil motor;

wherein an amount of driving to move the magnetic head when the linear drive mode is executed is smaller than the amount of driving to move the magnetic head when the pulse drive mode is executed; and wherein the magnetic head drive system executes the linear drive mode when an instruction value for controlling the drive current of the voice coil motor is less than a predetermined threshold and executes the pulse drive mode when the instruction value for controlling the driving current of the voice coil motor is higher than the predetermined threshold.

16. A magnetic disc storage apparatus comprising:

a magnetic head for reading information from a storage track on a magnetic storage disc driven to spin;

a voice coil motor for moving the magnetic head above the magnetic storage disc;

a magnetic head drive system for executing a position control of the magnetic head by controlling a driving current of the voice coil motor by a feedback control while monitoring a state of reading of the magnetic head; and a timing control circuit for determining a timing at which a transient value of the driving current of the voice coil motor constitutes an average value;

wherein the magnetic head drive system includes a multi-mode driving circuit executing a linear drive mode for controlling, as an analog amount, the driving current of the voice coil motor and executing a pulse drive mode for controlling, as a digital amount, the driving current of the voice coil motor, wherein an amount of driving to move the magnetic head when the linear drive mode is executed is smaller than the amount of driving to move the magnetic head when the pulse drive mode is executed; and wherein the timing control circuit switches between the linear drive mode and the pulse drive mode in synchronism with the timing determined by the timing control circuit.

17. A magnetic disc storage apparatus comprising:

a magnetic head for reading information from a storage track on a magnetic storage disc driven to spin;

a voice coil motor for moving the magnetic head above the magnetic storage disc; and a magnetic head drive system for executing a position control of the magnetic head by controlling a driving current of the voice coil motor by a feedback control while monitoring a state of reading of the magnetic head, wherein the magnetic head drive system includes a multi-mode driving circuit executing a linear drive mode for controlling, as an analog amount, the driving current of the voice coil motor and executing a pulse drive mode for controlling, as a digital amount, the driving current of the voice coil motor, wherein an amount of driving to move the magnetic head when the linear drive mode is executed is smaller than the amount of driving to move the magnetic head when the pulse drive node is executed;

wherein the multi-mode driving circuit includes:

a linear drive mode executing circuit for forming a linear control loop by a current detection circuit for detecting an average value of the driving current of the voice coil motor by converting the average value into a voltage, an error detection circuit for detecting a difference between the voltage detected by the current detection circuit and an instruction value for controlling the driving current, and a voice coil motor drive circuit outputting the driving current of the voice coil motor having a magnitude in correspondence with a detected output of the error detection circuit;

a pulse width modulation (PWM) circuit for generating a pulse having a width which is changed in accordance with the detected output of the error detection circuit;

a pulse drive mode executing circuit controlling an output current of the voice coil motor drive circuit by the pulse generated by the pulse width modulation circuit; and a switch circuit interposed between the linear control loop and the PWM circuit for switching between the linear drive mode and the pulse drive mode.

* * * * *

UNITED STATES PATENT AND TRADEMARK OFFICE
CERTIFICATE OF CORRECTION

PATENT NO.   : 6,903,894 B2　　　　　　　　　　　　　　　　　　　　　　Page 1 of 1
DATED        : June 7, 2005
INVENTOR(S)  : Kokami et al.

It is certified that error appears in the above-identified patent and that said Letters Patent is hereby corrected as shown below:

<u>Title page,</u>
Item [73], should read:
-- [73] Assignee: Renesas Technology Corporation, Tokyo (JP);
　　　　　　　　　　Hitachi ULSI Systems Co., Ltd., Tokyo (JP) --.

Signed and Sealed this

Thirtieth Day of August, 2005

JON W. DUDAS
*Director of the United States Patent and Trademark Office*